US010135826B2

(12) United States Patent
Reddy et al.

(10) Patent No.: US 10,135,826 B2
(45) Date of Patent: Nov. 20, 2018

(54) LEVERAGING SECURITY AS A SERVICE FOR CLOUD-BASED FILE SHARING

(71) Applicant: Cisco Technology, Inc., San Jose, CA (US)

(72) Inventors: K. Tirumaleswar Reddy, Bangalore (IN); Prashanth Patil, Mountain View, CA (US); Daniel Wing, Truckee, CA (US)

(73) Assignee: Cisco Technology, Inc., San Jose, CA (US)

( * ) Notice: Subject to any disclaimer, the term of this patent is extended or adjusted under 35 U.S.C. 154(b) by 178 days.

(21) Appl. No.: 14/845,505

(22) Filed: Sep. 4, 2015

(65) Prior Publication Data

US 2017/0070506 A1 Mar. 9, 2017

(51) Int. Cl.
*G06F 21/56* (2013.01)
*H04L 29/06* (2006.01)
*H04L 29/08* (2006.01)

(52) U.S. Cl.
CPC .............. *H04L 63/10* (2013.01); *G06F 21/56* (2013.01); *H04L 63/0428* (2013.01); *H04L 63/06* (2013.01); *H04L 63/062* (2013.01); *H04L 63/102* (2013.01); *H04L 63/20* (2013.01); *H04L 67/06* (2013.01); *H04L 67/10* (2013.01)

(58) Field of Classification Search
CPC ......... G06F 21/56; H04L 63/10; H04L 63/20; H04L 67/06
USPC ...... 709/220, 223–225, 229; 726/1–3, 22–24
See application file for complete search history.

(56) References Cited

U.S. PATENT DOCUMENTS 8,295,490 B1 * 10/2012 McCoy ................. H04L 9/0894
380/279
8,321,921 B1 11/2012 Ahmed et al.
8,806,201 B2 8/2014 Kailash et al.
8,843,734 B2 9/2014 Lim
(Continued)

OTHER PUBLICATIONS

A. Biggs et al., "Key Management Service Architecture", Cisco Systems, Internet Draft, Nov. 17, 2014, 48 pages.
(Continued)

*Primary Examiner* — Joseph P Hirl
*Assistant Examiner* — Kalish K Bell
(74) *Attorney, Agent, or Firm* — Edell, Shapiro, & Finnan, LLC

(57) ABSTRACT

A method of leveraging security-as-a-service for cloud-based file sharing includes receiving, at a cloud-based file sharing server external to an enterprise network and having connectivity to the enterprise network, instructions from an enterprise network to validate a file uploaded by a first user associated with the enterprise network before allowing the file to be downloaded. The file sharing server may then receive the file from the first user and forward the file to a cloud-based security-as-a-service (SECaaS) server that is also external to the enterprise network and has connectivity to the enterprise network. The file sharing server receives a determination of validation from the cloud-based SECaaS server and allows a second user to download the file based on the determination. To make the determination, the SECaaS server retrieves cryptographic keying material from a cloud-based key management server, and decrypts the file.

20 Claims, 4 Drawing Sheets

(56) References Cited

U.S. PATENT DOCUMENTS

| | | | |
|---|---|---|---|
| 8,892,766 B1* | 11/2014 | Wei | H04L 63/1408 |
| | | | 706/22 |
| 8,955,091 B2 | 2/2015 | Kailash et al. | |
| 2003/0046586 A1* | 3/2003 | Bheemarasetti | H04L 63/0272 |
| | | | 726/15 |
| 2008/0040503 A1* | 2/2008 | Kleks | H04L 63/145 |
| | | | 709/236 |
| 2014/0013103 A1* | 1/2014 | Giladi | H04L 63/0428 |
| | | | 713/150 |

OTHER PUBLICATIONS

M. Thomson, "Encrypted Content-Encoding for HTTP", Internet Draft, May 11, 2015, 17 pages.

"SecaaS Implementation Guide", Category 8 // Encryption, CSA Cloud Security Alliance, Sep. 2012, 28 pages.

* cited by examiner

LEVERAGING SECURITY AS A SERVICE FOR CLOUD-BASED FILE SHARING

TECHNICAL FIELD

The present disclosure relates to cloud computing services.

BACKGROUND

The collaboration industry is transitioning from premise deployed infrastructure, signaling, and media control to cloud hosted offerings. File sharing is a major component of most collaboration platforms and, thus, file sharing is now largely offered on cloud platforms. For example, some services now allow users to share files through Hypertext Transfer Protocol Secure (HTTPS) based file sharing servers deployed in the cloud. In order to encrypt the files being shared through file sharing servers deployed in the cloud, some services utilize a cloud-based key management server/service (KMS). A KMS can store, share, and create encryption keying material while decoupling the security from any collaboration or communication platform. Thus, an enterprise (e.g., a corporate entity) may maintain control of a communication or collaboration platform by utilizing a KMS.

In order to further secure transferred files, some systems may utilize a Security-as-a-Service (SECaaS) configuration. Generally, when SECaaS is implemented, a security provider integrates their security services into an enterprise network to monitor any file transfers occurring on the enterprise network.

DESCRIPTION OF EXAMPLE EMBODIMENTS

Overview

Figure 1:
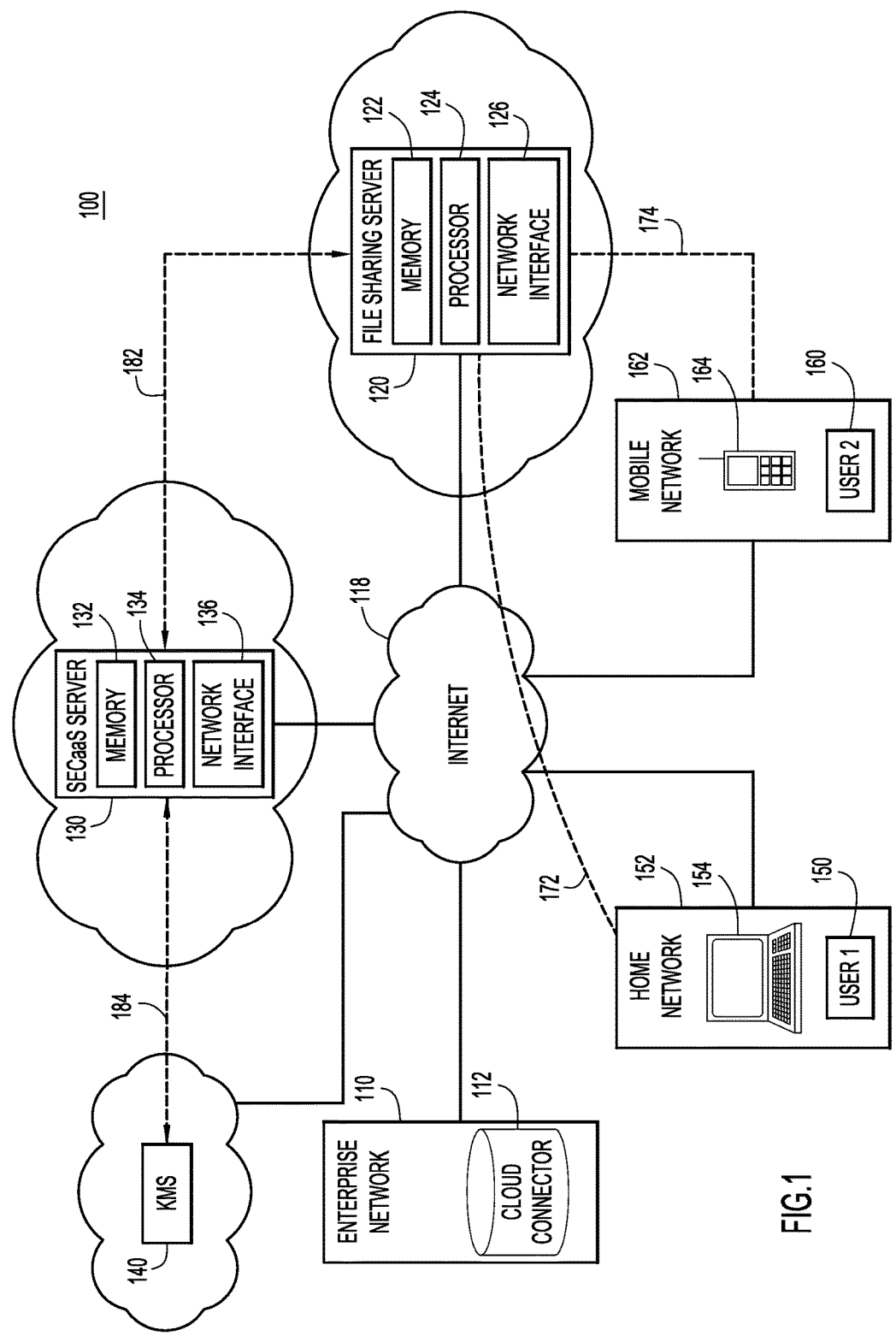
FIG. 1 is a block diagram of a cloud computing environment in which SECaaS is leveraged for cloud-based file sharing, according to an example embodiment.

Techniques are provided herein for leveraging Security-as-a-Service (SECaaS) for cloud based file sharing. These techniques may be embodied as a method, a system, and instructions in a computer-readable storage media to perform the method. Moreover, these techniques may be embodied as operations performed by a file sharing server and as operations performed by a SECaaS server.

According to at least one example embodiment, instructions from an enterprise network are received at a cloud-based file sharing server external to an enterprise network and having connectivity to the enterprise network. The instructions are configured to instruct the cloud-based file sharing server to validate a file uploaded by a first user associated with the enterprise network before allowing the file to be downloaded. The file sharing server then receives the file from the first user, the file specifying at least one second user authorized to download the file, and forwards the file to a cloud-based security-as-a-service (SECaaS) server. The cloud-based file sharing server receives a determination of validation from the cloud-based SECaaS server and allows the at least one second user to download the file based on the determination.

According to at least another example embodiment, a cloud-based security-as-a-service (SECaaS) server external to an enterprise network and having connectivity to the enterprise network, receives a request from the enterprise network for authorization information to perform file scanning services, such as for data loss prevention. The cloud-based SECaaS server provides the authorization information to the enterprise network and authenticates a cloud-based file sharing server based on the authorization information. Then, the cloud-based SECaaS server receives a file from the cloud-based file sharing server and retrieves cryptographic keying material from a cloud-based key management server. The cryptographic keying material allows the file to be decrypted and the cloud-based SECaaS server decrypts the file to produce a decrypted file, inspects the decrypted file to determine whether the decrypted file is malicious, and notifies the cloud-based file sharing server as to whether the decrypted file is malicious.

Example Embodiments

Presented herein are systems and methods for leveraging SECaaS for cloud-based file sharing and, in particular, for leveraging SECaaS for files being shared through a cloud-based file sharing server by users associated with an enterprise network while the users are in a location remote from the enterprise network. In other words, techniques provided herein enable cloud-based file sharing servers associated with an enterprise network to leverage SECaaS as files are shared through the file sharing server without requiring the file to reside in, enter, or exit the enterprise network. Thus, off-site users may safely and securely share files while infrastructure associated with the enterprise prevents data loss, infections, leaks, and other such security issues. In some embodiments, an enterprise network communicates, via a cloud connector, with a cloud-based file sharing server, a cloud-based SECaaS server/platform, and a cloud-based key management server (KMS) to obtain authorization information, such as tickets or tokens. Then, the enterprise network provides the various authorization information to the file sharing server and the SECaaS server/platform in order to enable these components to work together, or at least with one other component, to share, validate, and decrypt files that users associated with the enterprise network want to share. However, while the cloud connector may provide authorization information to establish relationships between the aforementioned components, the cloud connector may be unaware of file transfers occurring through the cloud-based file sharing server, as it may be off-path from the file transfer. Instead, the SECaaS server/platform and file sharing server can work together to provide network-based security without an on-path device triggering or authorizing their activity.

Reference is first made to FIG. 1, which illustrates a cloud computing environment 100 according to an example embodiment. The environment 100 includes an enterprise network 110 with a cloud connector 112 that connects the enterprise network 110 to various cloud services or applications through the Internet 118. In computing environment 100, the cloud connector 112 connects the enterprise network 110, through Internet 118, to a file sharing server 120, a SECaaS server/platform 130, and a KMS 140. The file sharing server 120 is a cloud-based service that allows users to transfer files between authorized users and may be hosted by a cloud collaboration service. In some embodiments, the file sharing server 120 is an HTTPS file sharing server 120, but in other embodiments the file sharing server 120 may be any type of file sharing server with any method of access. A SECaaS server 130 is also a cloud-based service and may be hosted by a service provider in order to offer various scanning, monitoring, or security-related services. The file sharing server 120 and the SECaaS server 130 include memory 122 and 132, a processor 124 and 134, and a network interface unit 126 and 136, respectively. The network interface units 126 and 136 enable network connectivity, such as to the Internet 118. KMS 140 allows users to securely create, share, rotate, and store cryptographic keying material, such as end-to-end (E2E) cryptographic keying material. In some embodiments, the KMS 140 may be a cloud-based service provided to users in an enterprise network, but in other embodiments KMS 140 may be an on-premise KMS.

In some embodiments, each of the file sharing server 120, the SECaaS server 130, and the KMS 140 may be hosted by different public cloud services and/or offered by different service providers and, thus, each of these services may not have a relationship with each other until a relationship is created by the cloud connector, as is explained in detail below. Moreover, each of the file sharing server 120, the SECaaS server 130, and the KMS 140 could be one or more physical servers or one or more virtual machine processes running in a data center/cloud computing environment.

As mentioned, the file sharing server 120 and the SECaaS server 130 may have memory 122 and memory 132, respectively. Generally, memory 122 and memory 132 may each include read only memory (ROM), random access memory (RAM), magnetic disk storage media devices, optical storage media devices, flash memory devices, electrical, optical or other physical/tangible (e.g., non-transitory) memory storage devices. Thus, in general, the memory 122 and memory 132 may each be or include one or more tangible (non-transitory) computer readable storage media (e.g., a memory device) encoded with software comprising computer executable instructions. For example, memory 122 may store instructions that may be executed by processor 124 for performing tasks associated with leveraging SECaaS to validate files uploaded to the file sharing server 120 as described below with reference to FIGS. 2 and 4. Memory 132 may store instructions that may be executed by processor 134 for performing tasks associated with providing SECaaS to file sharing server 120 in order to validate files uploaded to the file sharing server, as described below with reference to FIGS. 3 and 4.

Still referring to FIG. 1, various computing devices may also communicate with the cloud computing environment 100. For example, a first user 150 (User 1) on a home network 152 may communicate with the computing environment 100 through a desktop computer 154 and a second user 160 (User 2) on a mobile network 162 may communicate with the computing environment 100 through a mobile phone 164. However, these devices are simply examples and, in other embodiments, other devices, such as laptop computers, may be used to communicate with the cloud computing environment 100. Moreover, when the term "user" is referred to herein, it is to be understood that it implicitly refers to an action taken by and through the user's associated device (such as desktop computer 154 for the first user 150 (User 1) and the mobile phone 164 for the second user (User 2)).

Regardless of the device, users 150, 160 in cloud computing environment 100 are able to transfer files to the file sharing server 120 via the Internet 118 and/or receive files from the file sharing server 120 via the Internet 118. In FIG. 1, User 1 150 is shown transferring a file to the file sharing server 120 via pathway 172 and User 2 160 is shown receiving the file from the file sharing server 120 on a pathway 174. As is discussed in detail below, neither pathway 172 nor pathway 174 enters or exits the enterprise network 110 and, thus, the file does not enter the enterprise network 110 while being transferred between the users 150, 160 and the file sharing server 120. Consequently, the enterprise network 110 may be referred to as "off-path."

In addition to providing pathways 172, 174 for file transfers, cloud computing environment 100 may also enable different cloud-based services, platforms, and/or applications to communicate with each other. For example, in FIG. 1, file sharing server 120 is shown communicating, via pathway 182, with the SECaaS server 130 and the SECaaS server 130 is shown communicating, via pathway 184, with the KMS 140. These communications may be initiated and authorized by the cloud connector 112 of the enterprise network 110, as is described below in more detail with regards to FIGS. 2-4.

Figure 2:
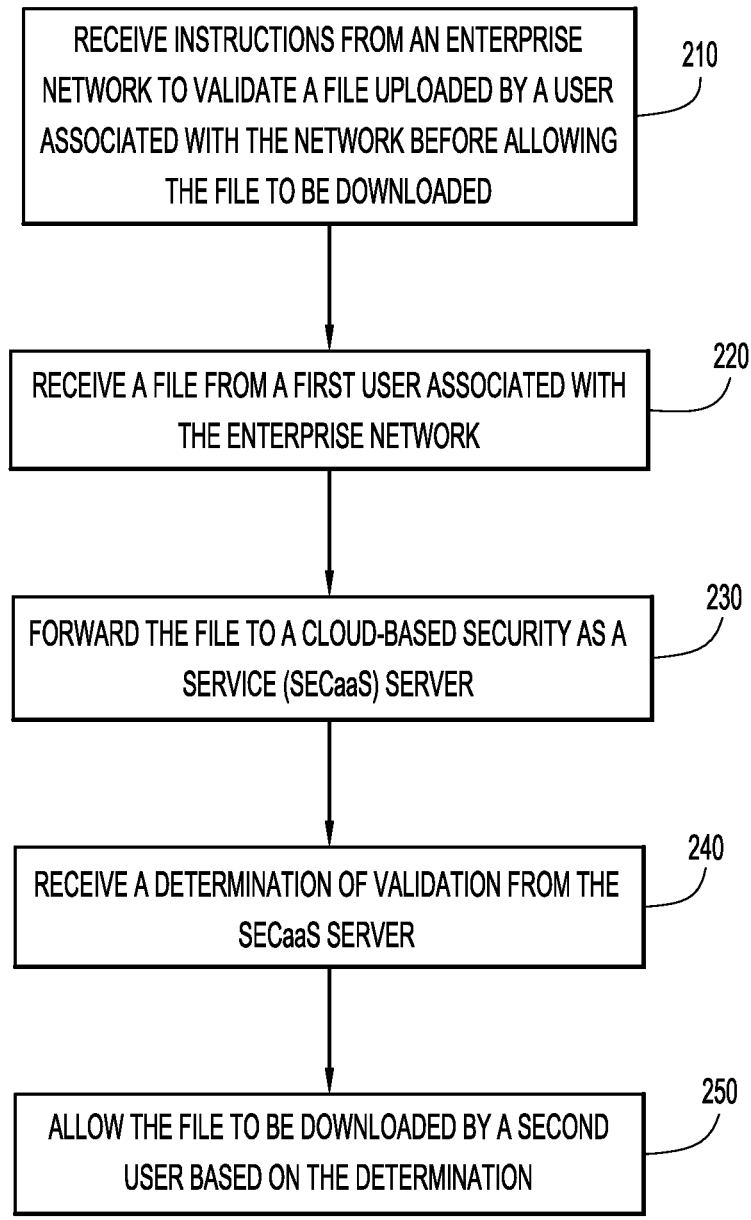
FIG. 2 is a high-level flowchart depicting operations performed by the file sharing server to facilitate leveraging SECaaS for cloud based file sharing, according to an example embodiment.

Now referring to FIG. 2, a high-level flowchart 200 depicting operations performed by the file sharing server 120 to facilitate leveraging of SECaaS server 130 for cloud-based file sharing, according to an example embodiment, is shown. Reference is also made to FIG. 1 for purposes of this description of FIG. 2. At step 210, the file sharing server 120 receives instructions from the enterprise network 110, perhaps via the cloud connector 112, to validate a file uploaded by a user associated with the enterprise network 110 before allowing the file to be downloaded. In some embodiments, any users that are employees of the enterprise may be considered to be associated with the enterprise network, but in other embodiments, any users with access to the file sharing server may be considered to be associated with the enterprise. In other words, an authorized user on the enterprise network may, for the purposes of this application, be considered to be associated with the enterprise network. If a user, such as User 1 150, is determined to be associated with the enterprise network 110, any file uploaded to the server by that user will need to be validated before another user can download the file. Thus, regardless of whether an uploading user is within the enterprise network 110 or remote from the enterprise network 110, any files uploaded to the file sharing server 120 by an uploading user associated with the enterprise network will be validated.

At step 220, the file sharing server 120 receives a file from a first user associated with the enterprise network 110. In some embodiments, the file may specify at least one second user who is authorized to download the file. Additionally or alternatively, the uploaded file may be encrypted and the file may include a uniform resource locator (URL) indicating the location of cryptographic keying material needed to decrypt the materials. For example, a user may use a cloud-based KMS 140 to encrypt the file and the uploaded file may include the URL of the key that is in the cloud-based KMS 140.

Once the file is received, the file sharing server 120 may forward the file, or a copy of the file, to the cloud-based SECaaS server 130 at step 230. The SECaaS server 130 may be any desirable security platform configured to provide security-related services, such as monitoring or scanning services, and may scan or examine the file in any desirable manner. Moreover, the SECaaS server 130 may be hosted by any service provider. In some embodiments, the file sharing server 120 is hosted by a first provider, such as a provider in the collaboration industry, and the SECaaS server 130 is hosted by a second provider, different from the first provider. In order to forward the file to the SECaaS server 130, the cloud connector 112 of the enterprise network 110 may provide the file sharing server 120 with authorization information, which may be a ticket that the cloud connector 112 previously retrieved from the SECaaS server 130. For example, the cloud connector 112 may have retrieved the authorization information when the enterprise associated with the enterprise network 110 entered into a contract for services with the provider of the SECaaS server 130. If the file being forwarded to the SECaaS server 130 is encrypted, the file sharing server 120 will forward the file while encrypted. In fact, the file sharing server 120 will not be able to access the URL or any other information indicating where the decryption key is located and, thus, when a received file is encrypted, the file sharing server 120 will not be able to decrypt the file. Thus, if the file sharing server 120 is hosted by a public server, users with access to the file sharing server, such as a cloud administrator, will not be able to open an uploaded file to view, modify, or tamper with the contents. Moreover, if an uploaded file is a malicious file, the encryption may prevent the file from infecting the file sharing server 120.

The file sharing server 120 will hold the file and prevent it from being downloaded until it receives a determination of validation from the SECaaS server 130, at step 240. Based on receiving the determination of validation, the file sharing server 120 allows the file to be downloaded by a second user or prevents the file from being downloaded by a second user at step 250. If the file sharing server 120 receives notice from the SECaaS server 130 that the file is valid (i.e., not malicious), then the file sharing server 120 may allow the file to be downloaded at step 250. Alternatively, if the file sharing server 120 receives a determination that the file is invalid (i.e., malicious), the file sharing server 120 prevents the file from being downloaded at step 250. The file sharing server 120 may also alert the first and/or second user that the file is malicious, even if the first and second users are not aware that SECaaS server 130 is being used in the process. In some embodiments, the file sharing server 120 may only allow users that were specified as authorized users by the uploading user to download valid files. Alternatively or additionally, in some embodiments, any user who has the URL associated with a valid file may download the valid file at step 250.

Notably, throughout the steps included in flowchart 200, the file sharing server 120 does not have access to a file after it has been decrypted. Instead, the file sharing server 120 receives a file, forwards the file, or a copy of the file, to the SECaaS server 130, and then holds the file until receiving confirmation of its validity. In fact, in some embodiments, the file sharing server 120 is not aware of the KMS 140 that is storing the cryptographic keying material. Instead, the file sharing server 120 serves as an external collaboration platform for the enterprise network, insofar as the file sharing server 120 is external of the enterprise network, and leverages the SECaaS server 130 that the enterprise network 110 has an established relationship with to validate files being shared through it. This allows the file sharing server 120 to be safely utilized by any users associated with the enterprise network regardless of where the users are located (i.e., remote from the enterprise network). More specifically, since the file sharing server 120 leverages cloud-based SECaaS to validate any received files, the file share server 120 can operate securely without requiring an on-path signal to be generated by the enterprise network 110 to alert the SECaaS platform to perform a validation.

Figure 3:
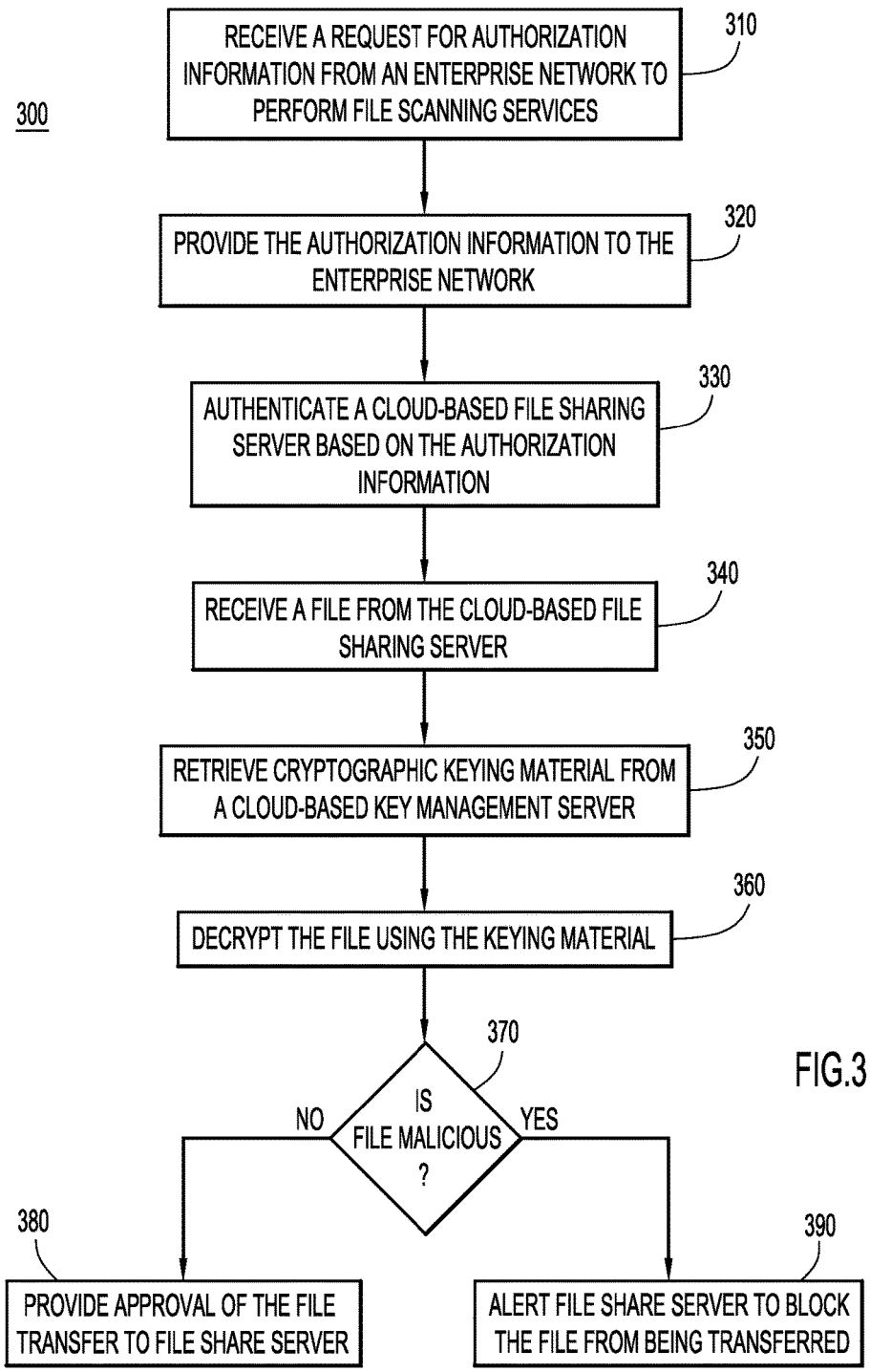
FIG. 3 is a high-level flowchart depicting operations performed by SECaaS to facilitate providing SECaaS for cloud based file sharing, according to an example embodiment.

Now turning to FIG. 3, a high-level flowchart 300 depicting operations performed by the SECaaS platform 130 to provide SECaaS for cloud-based file sharing, according to an example embodiment, is shown. Reference is also made to FIG. 1 for purposes of the description of FIG. 3. Initially, at step 310, the SECaaS server 130 receives a request from a cloud connector 112 of an enterprise network 110 for authorization information to perform file scanning services, such as malware scanning or data loss protection scanning. If the enterprise network 110 has a business relationship with the provider of the SECaaS server 130 (i.e., a contract for services), the SECaaS server 130 provides the authorization information to the cloud connector 112 at step 320. Once the cloud connector 112 receives the authorization information, the cloud connector 112 may provide the authorization information to other platforms, applications, etc. that the enterprise network 110 owns, has a contract with, or is otherwise associated with. For example, the cloud connector 112 may give the authorization information, perhaps in the form of a ticket that was provided by the SECaaS platform 130 at step 320, to a cloud-based file sharing server 120 that it has a business relationship with.

At step 330, the SECaaS server 130 may authenticate file sharing server 120 based on the authorization information. For example, in some embodiments, the cloud connector 112 may alert the SECaaS server 130 that the file sharing server 120 has the authorization information and the SECaaS server 130 may communicate with the file sharing server 120 to verify the file sharing server 120 has the authorization information. Alternatively, the SECaaS server 130 and file sharing server 120 may communicate in any desirable manner to confirm that the file sharing server 120 has the authorization information. Regardless, once the file sharing server 120 is authenticated, the SECaaS server 130 may begin to receive files from the file sharing server 120 for validation at step 340.

In order to validate the files received at step 340, the SECaaS server 130 may need to communicate with the KMS 140 in order to retrieve cryptographic keying material that will allow the SECaaS server 130 to decrypt the received files. In some of these embodiments, such as those embodiments where the SECaaS server 130 and KMS 140 are provided by two different vendors, the SECaaS server 130 needs to verify or authenticate itself with KMS 140 before it retrieves the keying material. In these embodiments, the SECaaS server 130 receives authorization information, such as in the form of a ticket or token, and instructions from the cloud connector 112 to communicate with cloud-based KMS 140 to fetch the cryptographic keying material for decrypting files. The authorization information may have been originally retrieved by the cloud connector 112 from the cloud-based KMS 140 in view of a business relationship established between the enterprise network 110 and the KMS 140.

Once the SECaaS server 130 retrieves the keying materials, the file can be decrypted with the keying material and inspected, scanned, or otherwise analyzed in order to determine if the file is malicious at step 370. After a determination is made as to whether the file is malicious, the SECaaS server 130 may notify the file sharing server 120 as to whether the file is malicious. If the file is not malicious, the SECaaS server 130 may provide approval of the file transfer to the file sharing server at step 380 and if the file is malicious, the SECaaS server 130 may either prevent the file from being downloaded or alert the file sharing server to block the file from being transferred at step 390. Notably, the SECaaS server 130 does not share or otherwise move the decrypted file to any other applications, platforms, or components of the computing environment 100 while making a determination of maliciousness. Instead, SECaaS server 130 decrypts files, analyzes the decrypted files, and provides notifications or alerts regarding the results of the analysis to the file sharing server 120. In some embodiments, the notifications may also provided to a user that is sending or receiving the file. For example, a user may receive a notification that a file is malicious, regardless of whether the user is aware of the SECaaS server 130.

Figure 4:
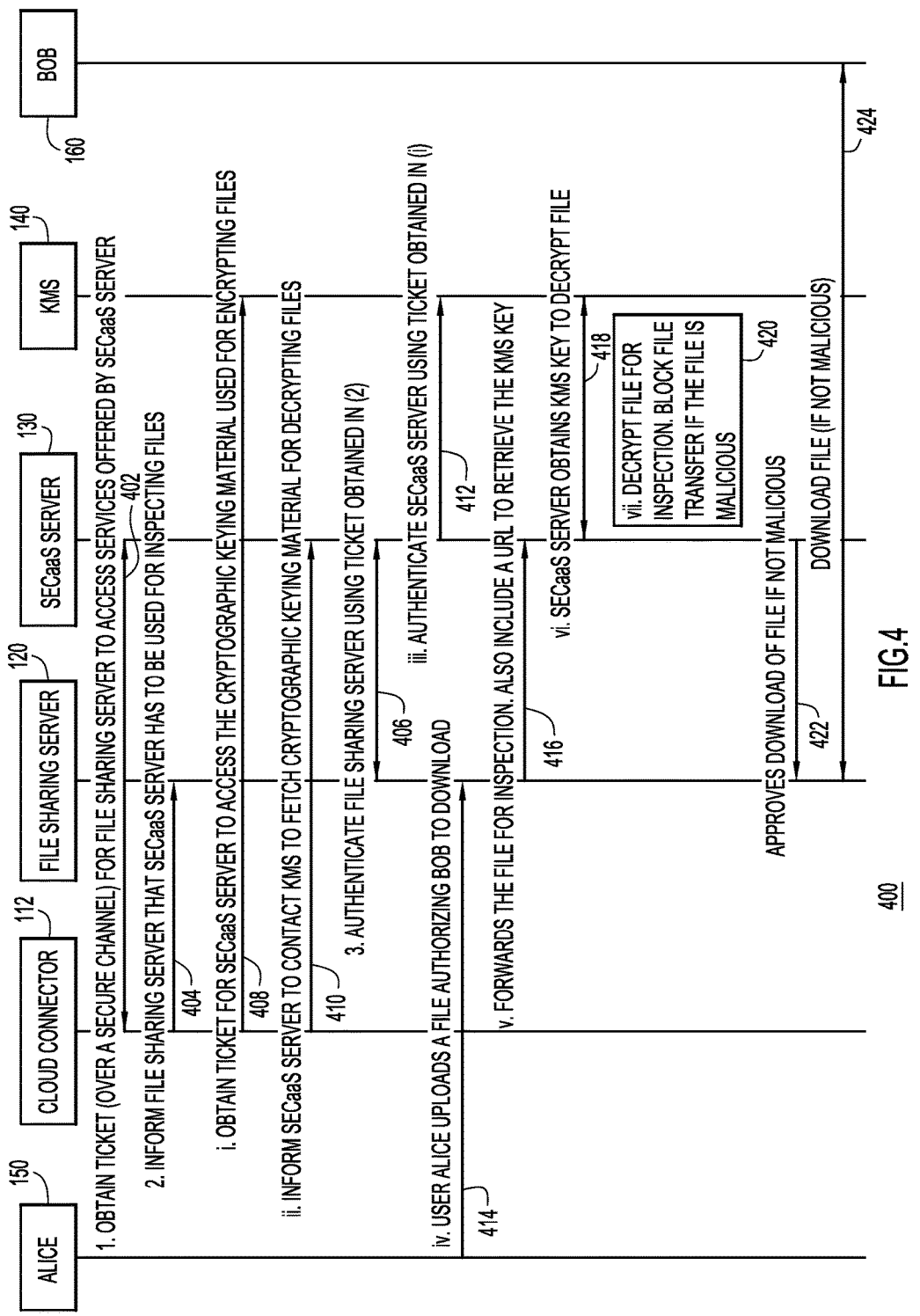
FIG. 4 is a sequence diagram depicting operations for leveraging SECaaS for cloud based file sharing, according to an example embodiment.

Now referring to FIG. 4 (with continued reference to FIG. 1), a sequence diagram 400 depicting example operations for leveraging SECaaS for cloud-based file sharing is shown. In the sequence diagram 400, a first user 150, "Alice," is uploading a file to a file sharing server 120 to be downloaded by a second user 160, "Bob." In this example, both Alice (user 150) and Bob (user 160) are associated with an enterprise network because they are employees of the enterprise, however, both Alice and Bob are in locations remote from the enterprise network, such as working from home on a home network, visiting a client (and connected to the Internet via the client's network), or simply out off premises from the enterprise and connected to the Internet via a mobile network. However, in other embodiments, Alice and/or Bob may be connected to the Internet via the enterprise network and still avail themselves of the operations depicted in sequence diagram 400.

As is described in detail below, prior to Alice uploading a file to the file sharing server 120, the cloud connector 112 associated with an enterprise network establishes relationships between the file sharing server 120 and the SECaaS server 130 as well as the SECaaS platform 130 and the KMS 140. Once these relationships are established, a user may transfer an encrypted file through the file sharing server while leveraging SECaaS from a third-party vendor without providing an on-path signal in the enterprise network to trigger scanning by the SECaaS platform. However, the sharing user (and the receiving user) need not be aware that SECaaS is being implemented and may provide the file to the file sharing server 120 as if SECaaS is not being used.

In order to establish a relationship between the file sharing server 120 and the SECaaS server, an authorization ticket is provided to the SECaaS server 130 by the file sharing server 120. In particular, at step 402, the cloud connector 112, which has a business relationship with the SECaaS server 130, requests and obtains an authorization ticket from the SECaaS server 130 to perform some file scanning service (e.g., malware scanning or data loss protection scanning). At step 404, the cloud connector 112 informs the file sharing server 120 of the authorization ticket that was obtained in step 402. At step 406, the file sharing server 120 presents that authorization ticket to the SECaaS server 130 which may authenticate the file sharing server 120 with the SECaaS server 130 and establish a relationship between these two components. Meanwhile, in order to establish a relationship between the SECaaS server 130 and the KMS 140, the cloud connector 112 requests and obtains a second authorization ticket (which is unrelated to the authorization ticket obtained in step 402 and simply referred to as a second authorization ticket for clarity) at step 408 from KMS 140, that will allow the SECaaS server 130 to access cryptographic keying material used for encrypting files exchanged through the file sharing server 120. At step 410, the cloud connector 112 sends the second authorization ticket to the SECaaS server 130 and informs the SECaaS server 130 to communicate with the KMS 140 to fetch the cryptographic keying material for decrypting files. At step 412, the SECaaS server 130 uses the second authorization ticket to authenticate and authorize itself with the KMS 140.

Subsequent to the aforementioned steps, the file sharing server 120 may be authorized with the SECaaS server 130 and the SECaaS server 130 may be authorized with the KMS 140 such that a user can upload encrypted files to a file sharing server 120 and both the files and file sharing server 120 will be secured by the SECaaS server 130, even though the users may be unaware that the SECaaS server 130 is being leveraged. In the example operations of FIG. 4, User 150 Alice uploads a file to the file sharing server 120 and authorizes Bob to download the file at step 414. At step 416, the file sharing server 120 forwards the file to the SECaaS server 130 for inspection. It also sends a URL that the SECaaS server 130 can use to retrieve a decryption key from KMS 140. At step 418, the SECaaS server 130 requests a key from KMS 140. However, without both the second authorization ticket (from step 408) and the URL (from step 416) the SECaaS server 130 will not be able to access the KMS 140 and locate the appropriate key. If the SECaaS server 130 has both the second authorization ticket and the URL, the SECaaS server 130 obtains the key at step 418 and can use the key to decrypt the file for inspection at step 420. After inspection, which may be performed using any desirable security services, the SECaaS server 130 informs the file sharing server 120 as to whether the file is malicious. If the file is malicious, the SECaaS platform 130 informs the file sharing server 120 to block transfers of this file at step 420. The SECaaS server 130, perhaps via the file sharing server 120, may also alert user 160 (Bob) and/or user 150 (Alice) that the file is malicious, regardless of whether the users 150, 160 are aware that SECaaS platform 130 is being leveraged. Alternatively, if the file is not malicious, the SECaaS server 130 approves the file for download at step 422 and the file sharing server 120 allows a second user 160 (Bob) to download the file at step 424.

There are several advantages to the techniques presented herein. As one example, techniques presented herein enable users located off-site from an enterprise premises to leverage a cloud-based file sharing server to share files with other users while leveraging the same SECaaS provided to users within the premises. Thus, techniques provided herein may substantially prevent users from sharing infected files, leaking intellectual property, or otherwise acting in a manner that is detrimental to enterprise files or assets regardless of their location. Similarly, since files being shared through the file sharing server in accordance with the techniques presented herein are not decrypted on the file sharing server, the administrator of the file sharing server cannot view, harm, or modify the files stored thereon and the files will not harm the file sharing server. As another example of an advantage of the techniques presented herein, the techniques presented herein work without a signal from an on-path device, unlike typical network-based security, and, thus, files can be shared safely without routing the files directly through the enterprise network. Consequently, the techniques presented herein may obfuscate the need for a Transport Layer Security (TLS) proxy between an endpoint and a file sharing server and may avoid any concerns of end-to-end cryptography inside a communication channel. More generally, techniques presented herein solve a problem unique to cloud computing environments (which enable enterprises to use an off-premises file sharing server) by providing technology that can securely transfer files between users associated with an enterprise network who are remote from the enterprise network.

Moreover, since the file sharing server, SECaaS and KMS of the techniques presented herein can each be cloud-based applications or platforms, an enterprise network can tie-up cloud services offered by different providers, thereby leveraging a variety of services that may provide a more optimized solution and/or cost savings. Additionally, since each of the SECaaS, file sharing server, and KMS may be hosted by various cloud providers and configured to automatically leverage each other's services, a user may not be aware of the set up and, in particular, may not be aware of the SECaaS. Accordingly, users uploading or downloading files do not need to implement any different code or operations because of the presence of SECaaS. In other words, the implementation of the techniques provided herein may allow users to interact with a file sharing server in the same manner as they would if the SECaaS was not being leveraged.

To summarize, in one form, a method is provided comprising: at a cloud-based file sharing server external to an enterprise network and having connectivity to the enterprise network, receiving instructions from the enterprise network to validate a file uploaded by a first user associated with the enterprise network before allowing the file to be downloaded; receiving the file from the first user, the file specifying at least one second user authorized to download the file; forwarding the file to a cloud-based security-as-a-service (SECaaS) server; receiving a determination of validation from the cloud-based SECaaS server; and allowing the at least one second user to download the file based on the determination.

In another form, a method is provided comprising: at a cloud-based security-as-a-service (SECaaS) server external to an enterprise network and having connectivity to the enterprise network, receiving a request from the enterprise network for authorization information to perform file scanning services; providing the authorization information to the enterprise network; authenticating a cloud-based file sharing server based on the authorization information; receiving a file from the cloud-based file sharing server; retrieving cryptographic keying material from a cloud-based key management server, the keying material allowing the file to be decrypted; decrypting the file; inspecting the decrypted file to determine whether the file is malicious; and notifying the cloud-based file sharing server as to whether the file is malicious.

In another form, a system is provided comprising: an enterprise network; a cloud-based security-as-a-service (SECaaS) server external to the enterprise network and having connectivity to the enterprise network; and a cloud-based file sharing server external to the enterprise network and having connectivity to the enterprise network, the cloud-based file sharing server being configured to: receive instructions from the enterprise network to validate a file uploaded by a first user associated with the enterprise network before allowing the file to be downloaded; receive a file from the first user, the file specifying at least one second user authorized to download the file; forward the file to the cloud-based SECaaS server; receive a determination of validation from the cloud-based SECaaS server; and allow the at least one second user to download the file based on the determination.

In yet another form, a system is provided comprising: an enterprise network; a cloud-based file sharing server external to the enterprise network and having connectivity to the enterprise network; a cloud-based key management server external to the enterprise network and having connectivity to the enterprise network; and a cloud-based security-as-a-service (SECaaS) server external to an enterprise network and having connectivity to the enterprise network, the cloud-based SECaaS server being configured to: receive a request from the enterprise network for authorization information that authorizes the SECaaS server to perform file scanning services; provide the requested authorization information to the enterprise network; authenticate the file sharing server using the authorization information; receive a file from the file sharing server; retrieve cryptographic keying material from the key management server, the keying material allowing the file to be decrypted; decrypt the file; inspect the decrypted file to determine whether the file is malicious; and notify the file sharing server as to whether the file is malicious.

In still another form, a non-transitory computer-readable storage media encoded with software comprising computer executable instructions and when the software is executed operable to cause a cloud-based file sharing server external to an enterprise network and having connectivity to the enterprise network to: receive instructions from the enterprise network to validate a file uploaded by a first user associated with the enterprise network before allowing the file to be downloaded; receive a file from the first user, the file specifying at least one second user authorized to download the file; forward the file to a cloud-based security-as-a-service (SECaaS) server having connectivity to the enterprise network; receive a determination of validation from the cloud-based SECaaS server; and allow the at least one second user to download the file based on the determination.

In still another form, a non-transitory computer-readable storage media encoded with software comprising computer executable instructions and when the software is executed operable to cause a cloud-based file sharing server external to an enterprise network and having connectivity to the enterprise network to: receive instructions from the enterprise network to validate a file uploaded by a first user associated with the enterprise network before allowing the file to be downloaded; receive a file from the first user, the file specifying at least one second user authorized to download the file; forward the file to a cloud-based security-as-a-service (SECaaS) server having connectivity to the enterprise network; receive a determination of validation from the cloud-based SECaaS server; and allow the at least one second user to download the file based on the determination.

In still another form, a non-transitory computer-readable storage media encoded with software comprising computer executable instructions and when the software is executed operable to cause a cloud-based security-as-a-service (SECaaS) server external to the enterprise network and having connectivity to the enterprise network to: receive a request from the enterprise network for authorization information that authorizes the SECaaS server to perform file scanning services; provide the requested authorization information to the cloud connector; authenticate a cloud-based file sharing server having connectivity to the enterprise network via the cloud connector based on the authorization information; receive a file from the file sharing server; retrieve cryptographic keying material from a cloud-based key management server having connectivity to the enterprise network via the cloud connector, the keying material allowing the file to be decrypted; decrypt the file; inspect the decrypted file to determine whether the file is malicious; and notify the cloud-based file sharing server as to whether the file is malicious.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a cloud-based file sharing server external to an enterprise network and having connectivity to the enterprise network, receiving instructions from the enterprise network to validate files uploaded by users associated with the enterprise network before allowing the files to be downloaded;
   receiving an encrypted file from a first user, the encrypted file specifying at least one second user authorized to download the encrypted file;
   determining that the first user is associated with the enterprise network and, thus, that any files received from the first user should be validated;
   based on the determining, forwarding the encrypted file from the file sharing server to a cloud-based security-as-a-service (SECaaS) server with which the cloud-based file sharing server is authenticated so that the cloud-based SECaaS server can decrypt the encrypted file and determine whether the file is malicious, the cloud-based SECaaS server being external to the cloud-based file sharing server and the enterprise network;
   receiving a determination of maliciousness from the cloud-based SECaaS server, wherein the cloud-based SECaaS server generates the determination based on a decrypted version of the encrypted file, but does not provide the file sharing server with access to the decrypted version, regardless of whether the encrypted file is determined to be malicious or non-malicious; and
   allowing the at least one second user to download the encrypted file based on the determination.

2. The method of claim 1, wherein forwarding the encrypted file to the cloud-based SECaaS server further comprises:
   forwarding a uniform resource locator (URL) to the cloud-based SECaaS server, the URL enabling the cloud-based SECaaS server to obtain cryptographic keying information from a cloud-based key management server having connectivity to the enterprise network, the cryptographic keying information allowing the encrypted file to be decrypted.

3. The method of claim 1, wherein at least one of the first user or the second user is located outside of the enterprise network.

4. The method of claim 1, wherein the first user and the second user are unaware of the SECaaS validation.

5. The method of claim 1, further comprising:
   authenticating the cloud-based file sharing server to the cloud-based SECaaS server with authorization information obtained by the enterprise network from the cloud-based SECaaS server.

6. The method of claim 1, wherein the enterprise network is off-path from a path used to receive the encrypted file.

7. The method of claim 1, wherein the encrypted file prevents users with access to the cloud-based file sharing server from opening, modifying, or tampering with the encrypted file.

8. A system comprising
   an enterprise network;
   a cloud-based security-as-a-service (SECaaS) server external to the enterprise network and having connectivity to the enterprise network; and
   a cloud-based file sharing server external to the enterprise network and the cloud-based SECaaS server, but having connectivity to the enterprise network and the cloud-based SECaaS server, the cloud-based file sharing server being configured to:
   receive instructions from the enterprise network to validate files uploaded by users associated with the enterprise network before allowing the files to be downloaded;
   receive an encrypted file from a first user, the encrypted file specifying at least one second user authorized to download the encrypted file;
   determine that the first user is associated with the enterprise network and, thus, that any files received from the first user should be validated;
   based on a determination that the first user is associated with the enterprise network, forward the encrypted file from the file sharing server to the cloud-based SECaaS server with which the cloud-based file sharing server is authenticated so that the cloud-based SECaaS server can decrypt the encrypted file and determine whether the file is malicious;
   receive a determination of maliciousness from the cloud-based SECaaS server, wherein the cloud-based SECaaS server generates the determination based on a decrypted version of the encrypted file, but does not provide the file sharing server with access to the decrypted version, regardless of whether the encrypted file is determined to be malicious or non-malicious; and
   allow the at least one second user to download the encrypted file based on the determination.

9. The system of claim 8, further comprising:
   a cloud-based key management server external to the enterprise network and having connectivity to the enterprise network, wherein the cloud-based file sharing server forwards the encrypted file to the cloud-based SECaaS server by:
   forwarding a uniform resource locator (URL) to the cloud-based SECaaS server, the URL enabling the cloud-based SECaaS server to obtain cryptographic keying information from the cloud-based key management server, the cryptographic keying information allowing the encrypted file to be decrypted.

10. The system of claim 8, wherein at least one of the first user or the second user is located outside of the enterprise network.

11. The system of claim 8, wherein the first user and the second user are unaware of the SECaaS validation.

12. The system of claim 8, wherein the file sharing server is further configured to:
   authenticate itself with the cloud-based SECaaS server with authorization information obtained by the enterprise network from the cloud-based SECaaS server.

13. The system of claim 8, wherein the enterprise network is off-path from a path used to receive the encrypted file.

14. The system of claim 8, wherein the encrypted file prevents users with access to the cloud-based file sharing server from opening, modifying, or tampering with the encrypted file.

15. A system comprising
   an enterprise network;

a cloud-based file sharing server external to the enterprise network and having connectivity to the enterprise network;

a cloud-based key management server external to the enterprise network and having connectivity to the enterprise network; and a cloud-based security-as-a-service (SECaaS) server that is external to the enterprise network and the cloud-based file sharing server, but that has connectivity to the enterprise network and the cloud-based file sharing server, the cloud-based SECaaS server being configured to:

receive a request from the enterprise network for authorization information that authorizes the SECaaS server to perform file scanning services;

provide the requested authorization information to the enterprise network;

authenticate the file sharing server using the authorization information;

receive an encrypted file from the file sharing server when the cloud-based file sharing server determines that the encrypted file is received from a user associated with the enterprise network and forwards the encrypted file based on the user being associated with the enterprise network;

retrieve cryptographic keying material from the key management server, the keying material allowing the encrypted file to be decrypted;

decrypt the encrypted file to generate a decrypted version of the encrypted file;

inspect the decrypted version of the encrypted file to determine whether the file is malicious; and notify the file sharing server as to whether the file is malicious while retaining the decrypted version at the SECaaS server so that the file sharing server cannot access the decrypted version, regardless of whether the encrypted file is determined to be malicious or non-malicious.

16. The system of claim 15, wherein the encrypted file is received from the file sharing server with a uniform resource locator (URL) and the cloud-based SECaaS server uses the URL to obtain the keying material from the cloud-based key management server.

17. The system of claim 15, wherein the authorization information is a first piece of authorization information and the cloud-based SECaaS server authorizes itself with the cloud-based key management server with a second piece of authorization information.

18. The system of claim 17, wherein the second piece of authorization information is received from the enterprise network, the enterprise network retrieving the second piece of authorization information from the cloud-based key management server.

19. The system of claim 15, wherein the enterprise network is off-path from a path used to receive the encrypted file.

20. The system of claim 15, wherein the encrypted file prevents users with access to the cloud-based file sharing server from opening, modifying, or tampering with the encrypted file.

* * * * *